US008363604B2

(12) United States Patent
Gurelli et al.

(10) Patent No.: US 8,363,604 B2
(45) Date of Patent: Jan. 29, 2013

(54) METHOD AND APPARATUS FOR CONTROLLING A TRANSMISSION DATA RATE BASED ON FEEDBACK RELATING TO CHANNEL CONDITIONS

(75) Inventors: Mehmet Gurelli, San Diego, CA (US);
Mehmet Yavuz, San Diego, CA (US);
Rashid A. Attar, San Diego, CA (US);
Nagabhushana Sindhushayana, San Diego, CA (US); Rajesh K. Pankaj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 745 days.

(21) Appl. No.: 11/344,698

(22) Filed: Jan. 31, 2006

(65) Prior Publication Data
US 2006/0171356 A1 Aug. 3, 2006

Related U.S. Application Data

(60) Provisional application No. 60/649,360, filed on Feb. 1, 2005.

(51) Int. Cl.
*H04W 4/00* (2009.01)
*H04J 1/16* (2006.01)
*H04J 3/14* (2006.01)
*G06F 11/00* (2006.01)
*H04L 12/28* (2006.01)
*H04M 1/00* (2006.01)
*H04B 1/38* (2006.01)
*H04B 1/00* (2006.01)
*H04B 7/00* (2006.01)

(52) U.S. Cl. ........ 370/329; 370/231; 370/232; 455/522; 455/561; 455/69

(58) Field of Classification Search .................. 370/229, 370/231, 232, 235, 329; 455/450, 451, 452.1, 455/452.2, 453, 522, 561, 69, 68
See application file for complete search history.

(56) References Cited

U.S. PATENT DOCUMENTS

| 6,707,856 B1 | 3/2004 | Gardner et al. |
| 6,901,254 B2 | 5/2005 | Ahn |
| 6,985,453 B2 | 1/2006 | Lundby et al. |
| 6,990,137 B2 | 1/2006 | Smee et al. |
| 7,050,759 B2 | 5/2006 | Gaal et al. |
| 7,305,461 B2 | 12/2007 | Ullman |
| 7,424,294 B2 | 9/2008 | Proctor et al. |

(Continued)

FOREIGN PATENT DOCUMENTS

| DE | 10141971 A1 | 3/2003 |
| EP | 1083719 A2 | 3/2001 |

(Continued)

OTHER PUBLICATIONS

Ekpenyong A. E., et al. "Markov Channel-Based Feedback Schemes for Adaptive Modulation Systems", Global Tele. Conf. 2004, IEEE Dallas, TX, vol. 2, Nov. 29, 2004, pp. 1091-1095.

(Continued)

*Primary Examiner* — Wesley Kim
(74) *Attorney, Agent, or Firm* — Stanton Braden

(57) ABSTRACT

A network entity includes a processor configured to regulate the data rate of transmissions over a wireless channel from a base station to a subscriber station based on feedback from the subscriber station, the feedback relating to the wireless channel conditions, the processor being further configured to determine a substitute data rate for one or more transmissions over the wireless channel.

41 Claims, 10 Drawing Sheets

U.S. PATENT DOCUMENTS

| | | | |
|---|---|---|---|
| 7,636,582 B2 | 12/2009 | Bi et al. | |
| 2001/0014101 A1 | 8/2001 | Spruyt et al. | |
| 2002/0039355 A1* | 4/2002 | Yun et al. | 370/318 |
| 2002/0141349 A1* | 10/2002 | Kim et al. | 370/252 |
| 2003/0031234 A1 | 2/2003 | Smee et al. | |
| 2003/0054773 A1* | 3/2003 | Vanghi | 455/70 |
| 2003/0157900 A1 | 8/2003 | Gaal et al. | |
| 2004/0101046 A1 | 5/2004 | Yang et al. | |
| 2004/0196800 A1 | 10/2004 | Padovani et al. | |
| 2005/0053023 A1 | 3/2005 | Rajkotia et al. | |
| 2006/0098580 A1* | 5/2006 | Li et al. | 370/245 |
| 2006/0146721 A1 | 7/2006 | Attar et al. | |
| 2006/0176815 A1 | 8/2006 | Picot et al. | |
| 2006/0252428 A1 | 11/2006 | Agashe et al. | |
| 2007/0042780 A1 | 2/2007 | Attar et al. | |
| 2007/0042781 A1 | 2/2007 | Yavuz et al. | |

FOREIGN PATENT DOCUMENTS

| | | | |
|---|---|---|---|
| EP | 1227603 A1 | 7/2002 | |
| JP | 2002118514 | 4/2002 | |
| JP | 2002171572 A | 6/2002 | |
| JP | 2002535903 | 10/2002 | |
| JP | 2004080306 A | 3/2004 | |
| JP | 2004533750 | 11/2004 | |
| JP | 2005508588 | 3/2005 | |
| JP | 2005512473 | 4/2005 | |
| JP | 2005524252 T | 8/2005 | |
| JP | 2008524946 | 7/2008 | |
| JP | 2008536408 | 9/2008 | |
| KR | 20040008230 | 1/2004 | |
| KR | 20040009762 A | 1/2004 | |
| RU | 2236761 C2 | 9/2004 | |
| WO | WO0036867 A1 | 6/2000 | |
| WO | WO03001838 A1 | 1/2003 | |
| WO | WO03009633 A1 | 1/2003 | |
| WO | WO03034646 A2 | 4/2003 | |
| WO | WO03034775 | 4/2003 | |
| WO | WO03051076 | 6/2003 | |
| WO | WO2004038988 | 5/2004 | |
| WO | WO2005018180 | 2/2005 | |

OTHER PUBLICATIONS

International Search Report—PCT/US06/003641, International Search Authority—European Patent Office, Aug. 25, 2006.

Bhushan, et al. : "CDMA2000 1XEV-DO Revision A: A physical layer and MAC layer overview," IEEE Communications Magazine, IEEE Service Center, Piscataway, NJ, US, vol. 44, No. 2, Feb. 1, 2006, pp. 75-87, ISSN: 0163-6804.

"cdma2000 High rate Packet Data Air Interface Specification," TIA/EIA/IS-856 (also known as CDMA2000 1xEV-DO) Nov. 2000.

cdma2000 High Rate Packet Data Air Interface Specification, 3GPP2 CS0024-A, Ver 4.0, Oct. 25, 2002.

"cdma2000 High Rate Packet Data Air Interface Specification," 3GPP2 C.S0024-A, Version 2.0, Jul. 2005.

DN Knisely, Chair, 3GPP2 TSG-C SWG 2.5: "Overview of HRPD Rev. A for TSG." Jun. 24, 2004,pp. 1-38, XP002416900.

Mingxi Fan et al: "On the reverse link performance of cdma2000 1xEV-DO revision a system" Communications, 2005. ICC 2005. 2005 IEEE International Conference on Seoul, Korea, May 16-20, 2005, Piscataway, NJ, ISA, IEEE, May 16, 2005, pp. 2244-2250, XP010826268.

Qi Bi, "A Forward Link Performance Study of the 1xEV-DO Rev. 0 System Using Field Measurements and Simulations," Bell Labs Technical Journal, vol. 10, No. 2, Aug. 3, 2005, pp. 5-19,XP002425903.

Taiwan Search Report—TW095130166-Mar. 16, 2010.

Tokgoz Y et al: "On the reverse link performance of the CDMA2000 IxEV-DO revision a system with antenna array receivers" Global Telecommunications Conference, 2005. Globecom 05. IEEE St. Loius, MO, USA Nov. 28-Dec. 2, 2005, Piscataway, NJ, USA,IEEE, vol. 6, Nov. 28, 2005, pp. 3373-3377, XP010882692 ISBN: 978-0-7803-9414-8 chapter II.

Written Opinion-PCT/US06/003641,European Patent Office, Aug. 25, 2006.

European Search Report—EP09153905, Search Authority—Munich Patent Office, Apr. 7, 2009.

3GPP2, cdma2000 High Rate Packet Data Air Interface Specification, 3GPP2 C.S0024-A Version 1 .0, Mar. 2004, p. 11-90 to 11-120, URL, http://www.3gpp2.org/Public_html/specs/C.S0024-A_v1.0_040331.pdf.

Mingxi Fan et al., "Detailed Description for QUALCOMM's RL Physical-layer Proposal for HRPD Rev.A Enhancement", 3GPP2 C30-DOAH ,(Sep. 15, 2003).

Translation of Office Action in Korean application 10-2008-7006390 corresponding to U.S. Appl. No. 11/506,068, citing WO0036867 and KR20040009762 dated Mar. 24, 2011.

Translation of Office Action in Japan application 2008-527121 corresponding to U.S. Appl. No. 11/506,068, citing 3GPP2_cdma2000_High_Rate_Packet_pgs_11_90_year_2004, JP2005524252 and JP2008536408 dated Nov. 16, 2010.

"A Forward Link Performance Study of the 1xEV-DO Rev. 0 System Using Field Measurements and Simulations", Lucent Technologies Bell Labs Innovations, Mar. 2004.

* cited by examiner

METHOD AND APPARATUS FOR CONTROLLING A TRANSMISSION DATA RATE BASED ON FEEDBACK RELATING TO CHANNEL CONDITIONS

CLAIM OF PRIORITY UNDER 35 U.S.C. §119

The present Application for Patent claims priority to Provisional Application No. 60/649,360, entitled "Method and Apparatus for Channel State Feedback Signal Erasure Mapping at Base Station," filed Feb. 1, 2005, and assigned to the assignee hereof and hereby expressly incorporated by reference herein.

BACKGROUND

1. Field

The present disclosure generally relates to communications, and more specifically, to controlling the transmission data rate in a wireless communications network based on feedback relating to channel conditions.

2. Background

In a wireless communications network, the receiver and transmitter share control information with each other. Often this control information is used to schedule transmissions and/or determine transmission parameters. One example is a data rate request sent from a subscriber station to the network, wherein such request is used by the network to control the data rate for transmissions to the subscriber station. If the network is not able to reliably receive a request, the network may allocate resources and/or determine sub-optimum transmission parameters. There is, therefore, a need for a method and apparatus to improve reliability of such received control information.

SUMMARY

One aspect of a network entity is disclosed. The network entity includes a processor configured to regulate the data rate of transmissions over a wireless channel from a base station to a subscriber station based on feedback from the subscriber station, the feedback relating to the wireless channel conditions, the processor being further configured to determine a substitute data rate for one or more transmissions over the wireless channel from the base station to the subscriber station when the feedback is corrupted.

One aspect of a base station is disclosed. The base station includes a transceiver configured to support a wireless channel with a subscriber station; and a processor configured to regulate the data rate of transmissions over a wireless channel to the subscriber station based on feedback from the subscriber station, the feedback relating to the wireless channel conditions, the processor being further configured to determine whether the feedback is corrupted based on one or more criteria, and if so, apply a method to determine a substitute data rate for one or more transmissions to the subscriber station.

Various aspects of a network entity may be embodied in computer-readable media comprising a program of instructions executable by a processor to perform a method of regulating the data rate of transmissions over a wireless channel from a base station to a subscriber station based on feedback from the subscriber station, the feedback relating to the wireless channel conditions. The method includes receiving corrupted feedback, and determining a substitute data rate for one or more transmissions from the base station to the subscriber station in response to the corrupted feedback.

An aspect of a method of regulating the data rate of transmissions over a wireless channel from a base station to a subscriber station based on feedback from the subscriber station is disclosed. The feedback relates to the wireless channel conditions. The method includes receiving corrupted feedback, and determining a substitute data rate for one or more transmissions from the base station to the subscriber station in response to the corrupted feedback.

DETAILED DESCRIPTION

Figure 1:
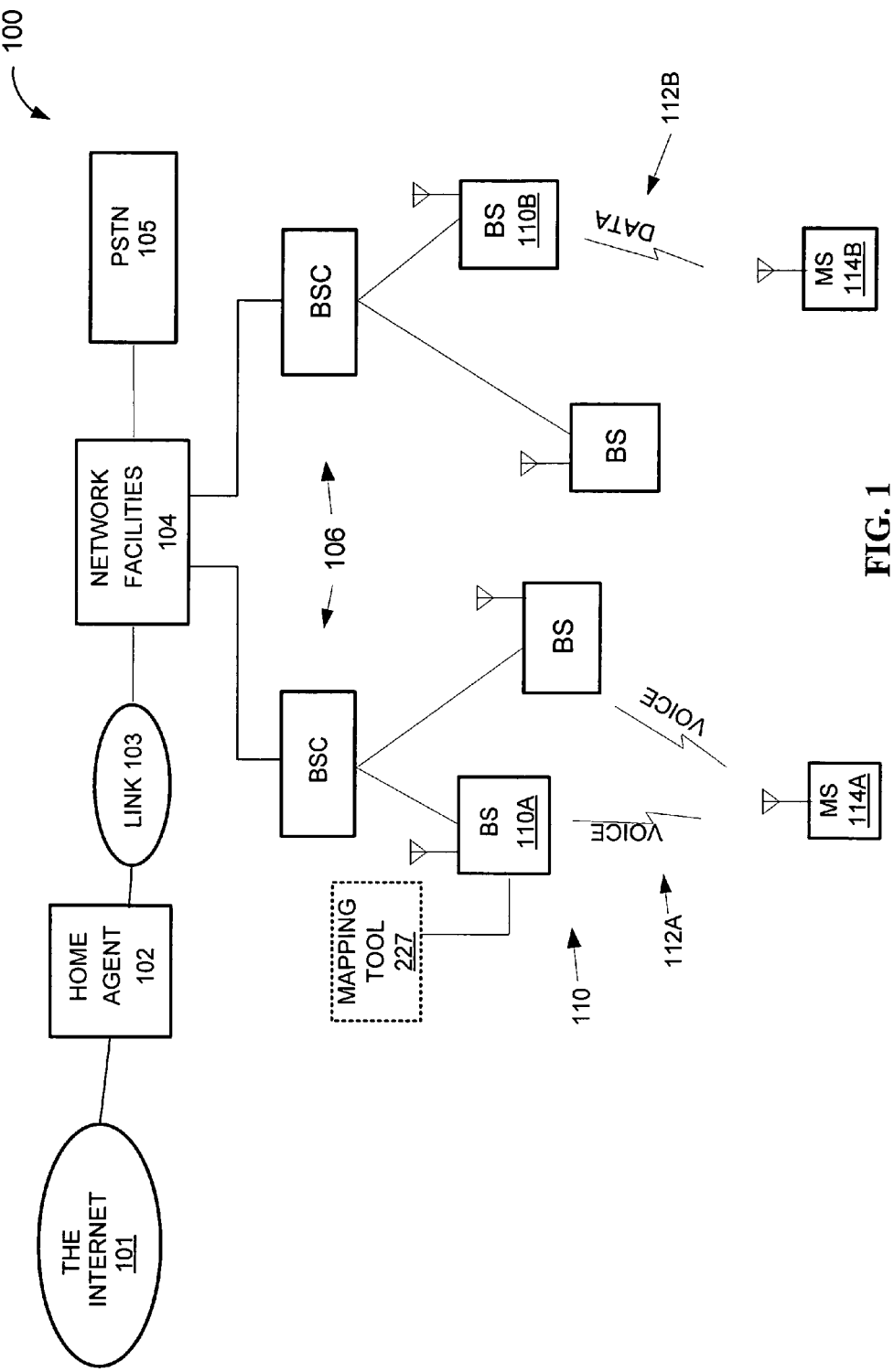
FIG. 1 is a functional block diagram illustrating an example of a wireless communications network.

In wireless communication networks, the reliability of transmissions from base stations to subscriber stations depends upon the power of the transmission and the speed at which bits are transmitted ("data rate"). Clearly, the most reliable transmission would occur if a base station were to utilize the maximum transmission power available and the lowest data rate. Although this works well from the standpoint of reliability, using a low data rate may be undesirable because it limits the number of subscribers that may be served by one base station, and also limits the amount of data that these subscribers could potentially download in a given time period.

Therefore, most wireless networks vary transmission power and/or data rate in order to reach a compromise or tradeoff between performance and cost. One example is a High Data Rate (HDR) system described by Telecommunications Industry Association (TIA) standard "cdma2000 High Rate Packet Data Air Interface Specification," TIA/EIA/IS-856, also known as CDMA2000 1xEV-DO. The IS-856 system reconciles performance and cost in the following manner. Base stations transmit at full power and adapt the data rate to respond to channel conditions. Channel conditions relate to properties such as short term fading, shadowing, and other electromagnetic signal propagation phenomena. Channel conditions manifest themselves at base stations in the form of noise, error rate, signal strength, and other such signal properties.

Channel conditions affect the data rate at which the subscriber station may receive data. In one embodiment, the subscriber station provides feedback to the base station relating to the channel conditions. Such feedback may be a measure of the channel conditions or may be a calculated data rate based on the channel conditions. The subscriber station may use the measured value and/or historical values to estimate or predict future channel conditions.

In the IS-856 system, each subscriber station provides feedback to the base station relating to the channel conditions on a Data Rate Control (DRC) channel. This feedback is referred to as a DRC "value," "DRC signal," "DRC index," or the like. The content, format, use, and other details of DRC values and DRC channels are explained in references such as the IS-856 standards document. The standards IS-856-Release 0 and IS-856-Revision A define a preset mapping between each DRC value and one or more compatible data rates. This mapping may be centrally available to the network and subscriber stations, or locally incorporated into one or more network entities and/or subscriber stations. The network uses a subscriber station's DRC value to select a compatible data rate for transmissions from the base station to that particular subscriber station over the forward link. Likewise, the subscriber station anticipates that the future forward link transmissions from the base station will utilize one of the data rates compatible with the subscriber station's last transmitted DRC value.

Under certain channel conditions, the feedback from the subscriber station to the base station could become corrupted. In the IS-856 system, corrupted feedback takes the form of a DRC erasure. A "DRC erasure" occurs when the base station can not properly receive the subscriber station's DRC value. A "DRC erasure" refers to a DRC value that is erroneous, ambiguous, missing, or otherwise invalid. In this case, the subscriber station is expecting that future transmissions from the base station will be conducted at the data rate appropriate to the subscriber station's most recently transmitted (but failed) DRC value. Lacking the subscriber station's most recent DRC value; however, prevents the network from selecting an optimum data rate, or the data rate expected (i.e., requested) by the subscriber station. If the base station uses the wrong data rate, the subscriber station will not be able to properly receive and decode the base station's transmissions. IS-856 subscriber stations do not attempt blind detection of base station data rates.

In the foregoing situation, transmissions from the base station to the subscriber station may be unsuccessful. This is undesirable, since it prevents the subscriber station from properly communicating with the base station, and further delays communications by requiring the subscriber station to retransmit the DRC value at the expense of bandwidth, battery power, and time. DRC erasures are undesirable as they may lead to higher and unacceptable latencies for delay sensitive applications and wasted bandwidth.

Hardware Environment

FIG. 1 is a functional block diagram illustrating an example of a wireless communications network 100. In one embodiment, the network 100 may be implemented as a High Data Rate (HDR) wireless network such as TIA IS-856 Release 0 or TIA IS-856 Revision A type network. This type of network, for example, is useful for wireless subscriber stations to receive e-mail, surf the Internet, and exchange other data. In addition, the network 100 may be implemented as a wireless cellular telephone system according to TIA standard IS-95. The IS-95 standard utilizes Code Division Multiple Access (CDMA) modulation techniques to wirelessly conduct voice calls with greater capacity and more robust performance than earlier wireless communications technologies.

Various subscriber stations 114 are shown roaming through the network 100. The subscriber stations 114 may be wireless telephones, laptop computers, personal digital assistants (PDA)s, data transceivers, modems, pagers, cameras, game consoles, or any other suitable mobile communications device. The subscriber stations 114 may be referred to by those skilled in the art as handsets, wireless communications devices, user terminals, access terminals, user equipment, mobile stations, mobile units, subscriber units, mobile radios, radio telephones, wireless stations, wireless devices, or some other terminology. The various concepts described throughout this disclosure are intended to apply to all wireless communication devices regardless of their specific nomenclature.

As shown in FIG. 1, telephone calls and other communications may be conducted by exchanging data between subscriber station 114A and base station 110A via Radio Frequency (RF) electromagnetic signal channel 112A. In the HDR context, HDR communications are conducted by exchanging Internet Protocol (IP) packet data between subscriber station 114B and base stations 110B for relay to the Internet 101 or some other packet data network (not shown) such as a corporate or other closed network. Examples of packet data include IP datagrams used for such applications as accessing web pages and retrieving e-mail. Such packet data applications may run directly on the subscriber station 114B, or may run on a separate computer device that uses the subscriber station 114B as a wireless modem. As shown in FIG. 1, subscriber station 114B communicates packet data with the wireless network 100 via RF electromagnetic signal channel 112B.

Subscriber stations 114 are served by various base stations 110, which exchange voice and/or packet data content with the subscriber stations 114. As one example, the base stations 110 relay voice signals to/from the subscriber stations 114. Base stations 110 may also exchange other types of information with the subscriber stations 114, such as call paging messages, origination messages, registration messages, pilot signal reports, and other message types. Some or all of the base stations 110 may be implemented using hardware such as that used by conventional base stations in commercial use today.

In one embodiment of the network 100, each base station 110 has access to a mapping tool, such as the mapping tool 227 illustrated in connection with base station 110A. The mapping tool 227 provides a mechanism for the base station 110A to input a DRC value and receive a compatible data rate. In other words, the mapping tool provides a pre-designated assignment matrix that translates between DRC values and data rates assigned to those DRC values. The relationship between DRC values and compatible data rates is established by design of the network 100, and may be changed by updating a shared, central mapping tool 227 (in one example) or by propagating updates to local mapping tools 227 (in another example).

As a more detailed example, the mapping tool 227 may provide one mapping between DRC values and compatible single user packet transmission formats, and another mapping between DRC values and compatible multi-user packet transmission formats. Single and multi-user packet transmissions are described in greater detail below.

To provide several examples, the mapping tool 227 may comprise an appropriate relational database, lookup table, linked list, index, or other data structure. The mapping tool 227 may be implemented as a machine, circuit, software routine, firmware, or data structure contained in machine-readable storage, or another device. In one example, the mapping tool 227 may be a standalone device (as shown in FIG. 1 without any intended limitation), accessible to the base station 110A by direct electrical connection, Internet, radio frequency link, Public Switched Telephone Network (PSTN), or other coupling. In this example, there may be many mapping tools individually accessible by base stations 110 or a central mapping tool accessible to all base stations 110. In a different example, mapping tools such as 227 may be integrated into corresponding base stations 110 such as base station 110A.

Each base station 110 is coupled to a Base Station Controller (BSC) 106, which conducts two-way information flow between base stations 110 and various network facilities 104 (described below). The BSCs 106 perform various functions that allow mobile communications to take place, including orchestrating the handoff of subscriber stations 114 between base stations 110. In an IS-856 capable network, the BSCs 106 may include a Packet Control Function (PCF) module (not shown) to exchange IP data packets with the base stations 110. Each BSC 106 may be implemented using hardware such as that used by conventional wireless networks 100 in commercial use today, for example.

Figure 3:
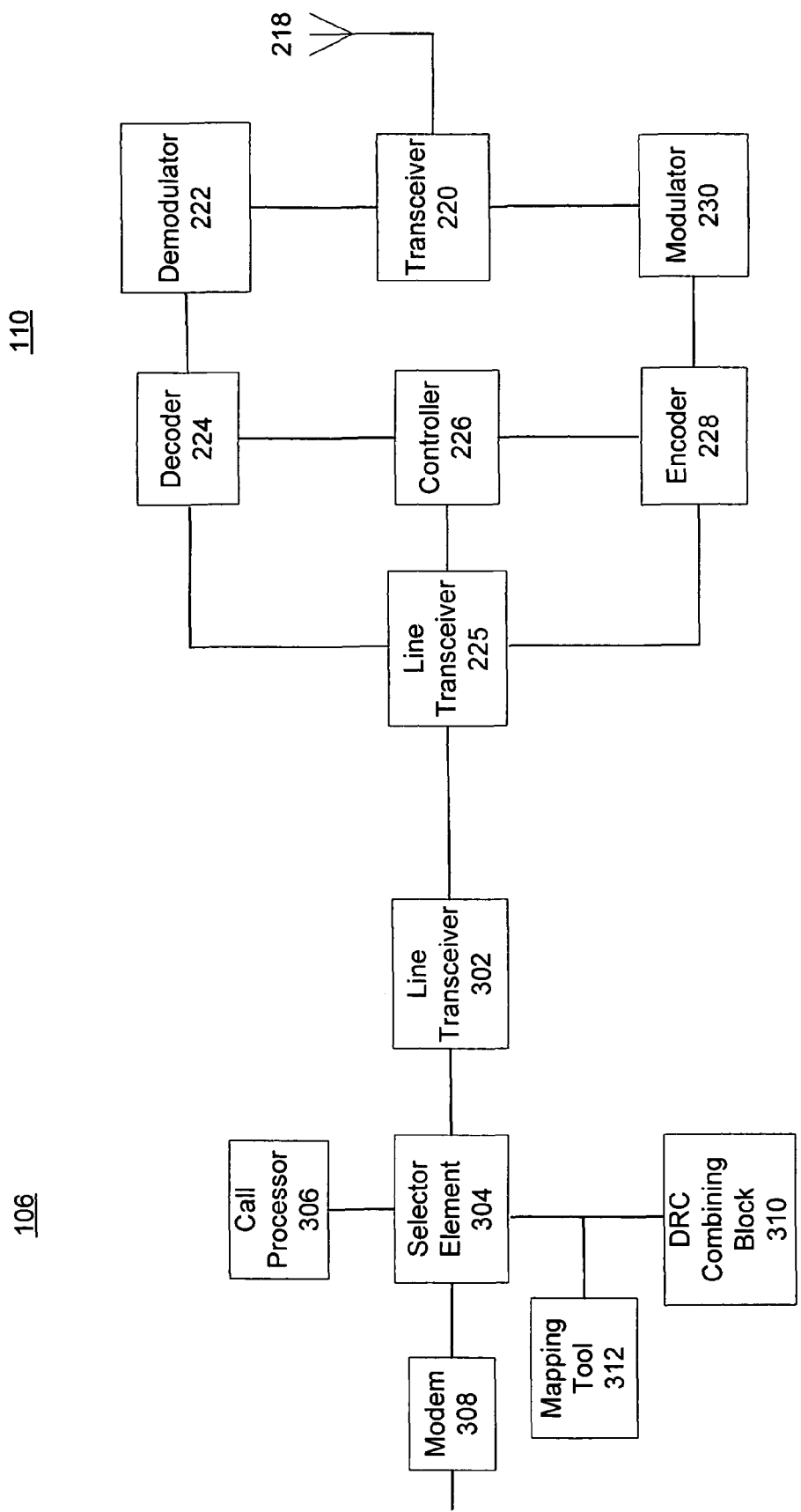
FIG. 3 is a functional block diagram illustrating an example of a Base Station Controller (BSC) and base station in a wireless communications network.

In an alternative embodiment of the network 100, the mapping function may be performed by the BSC 106. By mapping the DRC values to data rates at the BSC, subscriber stations 114 in communication with multiple base stations 110 may experience improved performance during poor channel conditions. In this embodiment, the DRC values generated by a subscriber station 114 and transmitted to multiple base stations 110 may be combined at the BSC 106. The manner in which the DRC values are combined may vary depending on the specific application and the overall design constraints imposed on the system. By way of example, the BSC 106 may select one of the multiple DRC values to map to a data rate. In other words, a DRC erasure from one base station 110 will have minimum impact on system performance if the BSC has available DRC values from other base stations 110. Alternatively, the BSC 106 may combine the signal energy of the DRC values from the multiple base stations 110 to increase reliability. The combined DRC values can then be provided to the mapping tool 227 to determine a data rate for the forward link transmission from multiple base stations 110 to the subscriber station 114. Each BSC 106 may have a dedicated mapping tool 312 implemented either as a standalone device or an integrated component of the BSC 106. Alternatively, a central mapping tool 312 may be provided for multiple BSCs 106. The central mapping tool 312 may be a standalone device, integrated into a BSC 106 (as shown in FIG. 3) or other network entity, or distributed among multiple network entities.

As mentioned above, the BSCs 106 provide information flow between the base stations 110 and the network facilities 104. The network facilities 104 may include components such as a Mobile Switching Center (MSC), Mobile Telephone Switching Office (MTSO), etc. A MSC component, for example, relays voice stream information between the BSCs 106 and the PSTN 105. The MSC operates to provide mobility control, call processing, and call routing functionality. As an example, a data services Interworking Function (IWF) (not shown) may be used to connect the network facilities 104 to the PSTN 105.

In regard to HDR information (such as an IS-856 type system), the network facilities 104 may also include components such as one or more foreign agents. In this context, the network facilities 104 exchange IP data between the BSCs 106 and one or more home agents 102 via a link 103, which comprises a wireless or wire-line T1 or T3 link, fiber optic connection, or Ethernet, or other IP connection. The home agent 102, in turn, is coupled to the Internet 101.

Figure 2:
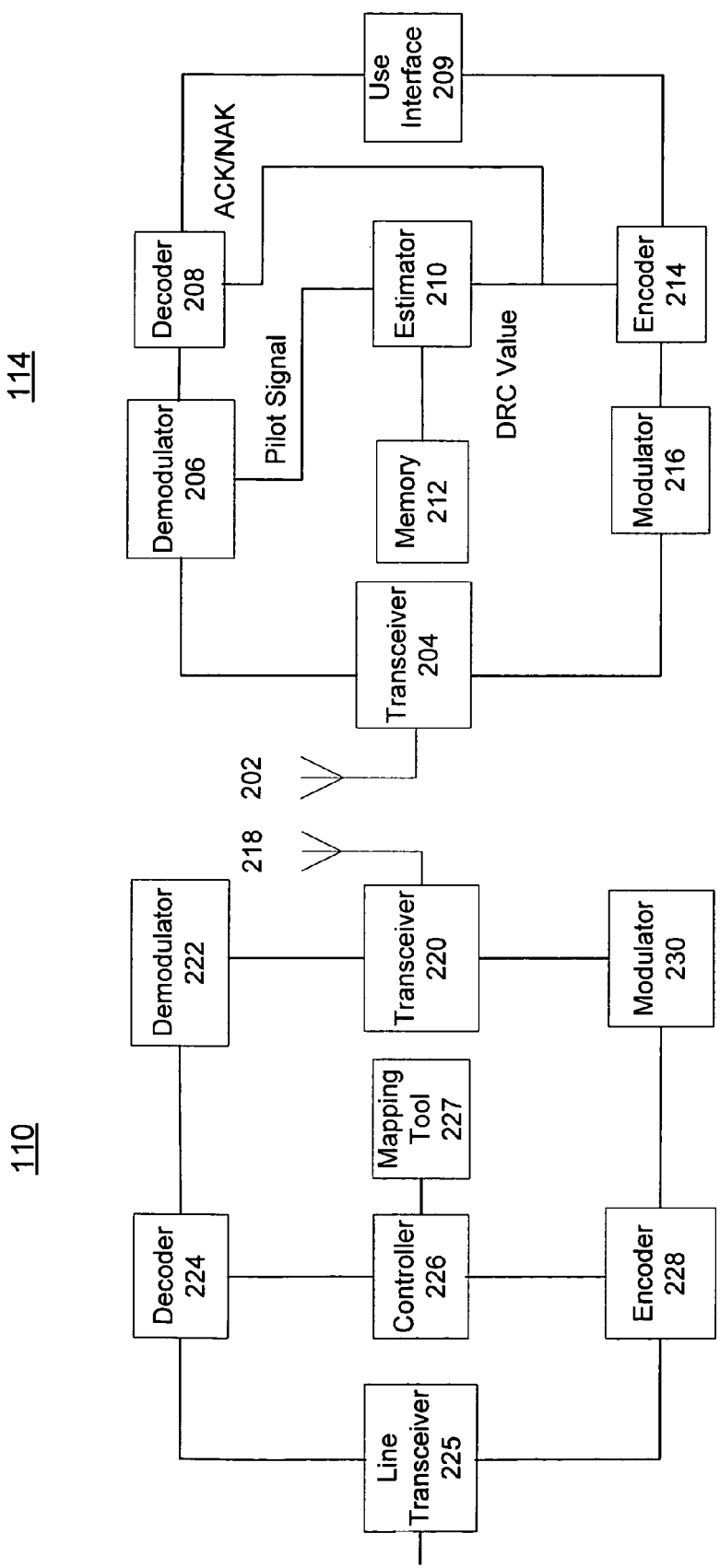
FIG. 2 is a functional block diagram illustrating an example of a base station and a subscriber station in a wireless communications network.

FIG. 2 is a functional block diagram illustrating an example of a base station 110 and a subscriber station 114 in a wireless communications network 100. The subscriber station 114 includes an antenna 202 which couples signal transmissions from the base station 110 to a transceiver 204. The transceiver 204 filters, amplifies, and downconverts the signal transmissions to baseband. The baseband signals are processed by a demodulator 206 and a decoder 208 before the resulting data is provided to a user interface 209. An acknowledgement (ACK) based protocol may be used by the decoder 208 to provide feedback to the base station 110 indicating whether the signal transmissions are being decoded properly at the subscriber station 114.

The channel conditions may be estimated by the subscriber station 114 using a pilot signal embedded in the forward link transmission. The pilot signal is not encoded, and therefore, can be provided directly from the demodulator 206 to a channel estimator 210. Since the pilot signal is known, a priori, a replica can be stored in memory 212 in the subscriber station 114. Based on the received pilot signal and the replica of the pilot signal stored in the memory 212, the channel estimator 210 can provide feedback to the base station 110 relating to the channel conditions of the forward link. The feedback may take the form of Signal-to-Interference-and-Noise Ratio (SINR), Carrier-to-Interference ratio (C/I), Energy-per-bit to Noise ratio ($E_b/I_o$), or any other suitable type of metric. The feedback can be quantized, mapped to DRC values, and provided to a modulator 216. Using spread-spectrum processing, the modulator 216 places encoded data from the user interface 209, the DRC value from the channel estimator 210 and the ACK/NAK message from the decoder 208 on the appropriate channels and provides them to the to the transceiver 204 for transmission over the reverse link to the base station 110 through the antenna 202.

A DRC value from the channel estimator 210 and an ACK message from the decoder 208 may be provided to the encoder 214 in each time slot. In 1xEV-DO (Release A), the forward link transmission is partitioned into 20 millisecond (ms) frames with each frame having sixteen 1.25 ms time slot. Alternate embodiments may use other schemes, such as according to a predetermined call/answer relationship, prescribed time schedule, or other arrangement. The format, content, and significance of various DRC values are already known in the relevant art, with one example being those DRC values described in one or more of the following materials: (1) "cdma2000 High Rate Packet Data Air Interface Specification" (numbered 3GPP2 C.S0024-A), prepared by the 3GPP2 organization, (2) TIA standard IS-856, also known as CDMA2000 1xEV-DO.

The reverse link signal transmissions from the subscriber station 114 are received by an antenna 218 at the base station 110 and provided to a transceiver 220. The transceiver 220 filters, amplifies, and downconverts the signal transmissions to baseband. The baseband signals are processed by a demodulator 222 and provided to a decoder 224. The decoder 224 processes the signals, providing data to the BSC 106 (not shown) through a line transceiver 225, and providing DRC values and ACK/NACK messages to a controller 226.

The controller 226 utilizes a mapping tool 227 to convert the DRC values to compatible data rates, and in some cases, data packet formats. In the case of IS-856 1xEV-DO (Release 0), there is a one-to-one mapping between each DRC value and corresponding data rate. In the case of standard IS-856 1xEV-DO (Revision A), each DRC value is mapped to multiple data rates, but the standard provides detailed instructions on the selection of a single, compatible data rate in order to ultimately achieve a one-to-one mapping. In the event of a DRC erasure, the controller 226 invokes a method that selects a substitute data rate. The substitute data rate may be selected in a variety of ways, with a number of examples being discussed in greater detail below.

An encoder 228 performs various signal processing functions on the data received from the BSC 106 (not shown) via the line transceiver 225. These signal processing functions are performed at the data rate and data packet format (e.g., single-packet format or multiple-packet format) set by the controller 226. The encoded signals are provided to the modulator 230 for further processing before being sent to the transceiver 220 for filtering, amplification, and upconversion to a frequency suitable for forward link transmission through the antenna 218 to the subscriber station 114.

FIG. 3 is a functional block diagram illustrating an example of a BSC 106 and base station 110 in a wireless communications network 100. In this example, the BSC 106 determines the data rate and data packet format for the forward link transmissions from one or more base stations 110. For ease of explanation, only one base station 110 is shown. The BSC 106 communicates with the base station 110 using line transceivers 302 and 225, respectively. The BSC 106 also includes a number of selector elements 304, although only one is shown in FIG. 3 for simplicity. One selector element 304 is assigned to control the communications between one or more base stations 110 and a subscriber station 114. If a selector element 304 has not been assigned to a subscriber station 114, a call control processor 306 directs the base station 110 to page the subscriber station 114. The selector element 304 interfaces with various network facilities (not shown) through a network interface or modem 308.

In this embodiment of the network 100, the DRC values are recovered from the decoded data stream at the selector element 304 and provided to a DRC combiner block 310. The output of the DRC combiner block 310 is provided to a mapping tool 312 where the combined DRC value is converted to a corresponding data rate and data packet format. The data rate and data packet format is provided to the selector element 304 in the BSC 106 for routing back to the appropriate base stations 110. In the configuration shown in FIG. 3, the data rate and data packet format is provided to the selector element 304, which in turn sends this information to the controller 226 in the base station 110.

Figure 4:
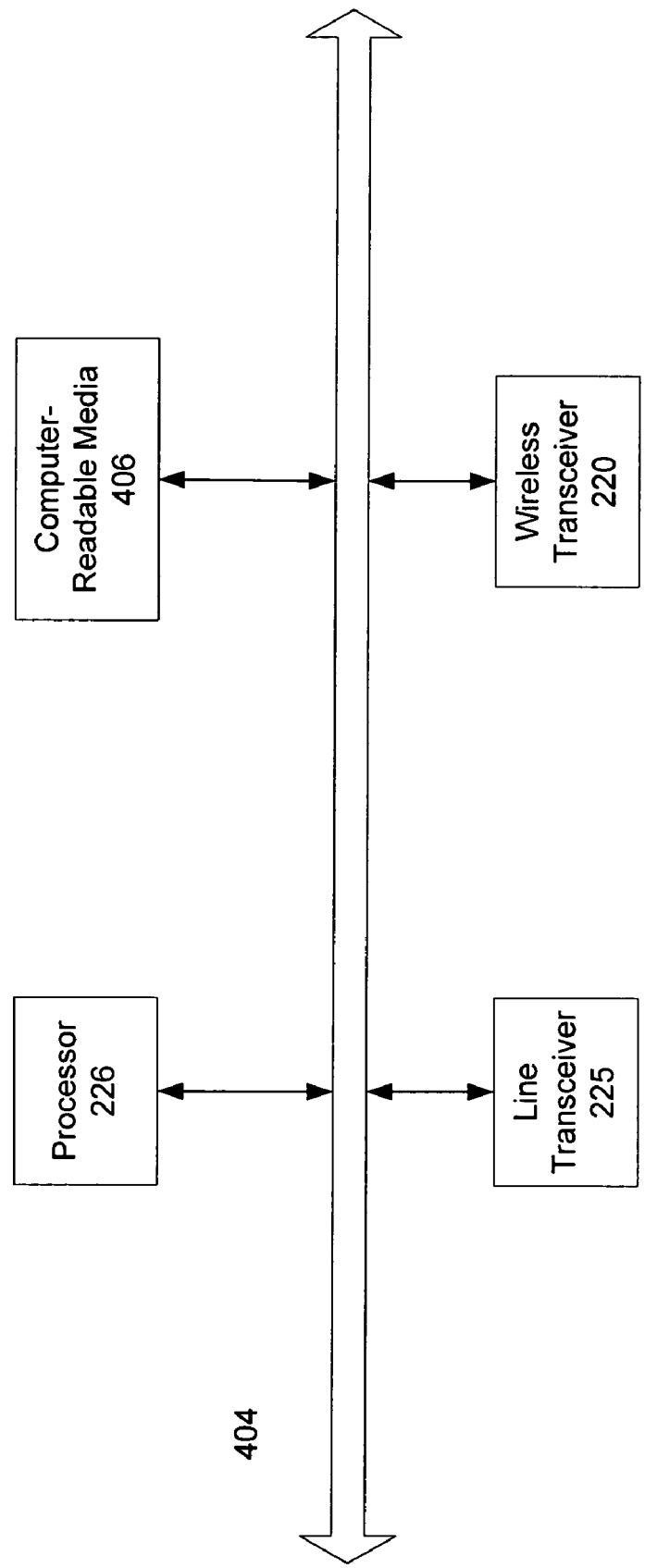
FIG. 4 is a functional block diagram illustrating an example of a hardware configuration for a base station in a wireless communications network.

FIG. 4 is a block diagram illustrating the hardware configuration of a base station 110. The base station 110 includes a processor 226 which communicates with a number of devices via a system bus 404. The processor 226 may be one or more processing entities that are implemented in hardware, software, firmware, or any combination thereof. By way of example, the processor 226 may be implemented with a microprocessor that supports a number of software applications. One or more of these software applications may used to implement various signal processing functions such as modulation, demodulation, encoding, and decoding, as well as the functionality of the controller (see FIG. 2). The software application(s) supporting the controller function may include an Application Program Interface (API), or some other interface, to access the mapping tool 227. In an alternative embodiment of the processor 226, the microprocessor may off load one or more signal processing functions to a Digital Signal Processor (DSP), or some other processing entity.

The base station 110 may also include computer-readable media 406 that stores the software applications for the processor 226. The computer-readable media 406 may be implemented with one or more entities. By way of example, the computer-readable media 406 may be non-volatile and volatile memory. The non-volatile memory may be implemented with direct access storage (e.g., a conventional hard drive, redundant array of inexpensive disks (RAID), or another direct access storage device (DASD)); serial-access storage such as magnetic or optical tape; electronic non-volatile memory (e.g., ROM, EPROM, flash PROM, or EEPROM); battery backup RAM; optical storage (e.g., CD-ROM, WORM, DVD, digital optical tape); paper punch cards, or other suitable computer readable media. When the base station 110 is operational, software applications may be loaded from non-volatile memory to higher speed volatile memory for quick access by the processor 226. The volatile memory may be implemented with RAM, SRAM, SDRAM, or any other high speed volatile memory. Caches may also be used to further increase the speed of memory access by the processor 226. The processor 226 may also include temporary storage such as caches, instruction registers, general file registers, and the like. Those skilled in the art will recognize that the term "computer-readable media" includes any type of storage device that is accessible by the processor 226.

As an alternative to a software based architecture, the processor 226 may be implemented with logic. Depending upon the particular requirements of the application in the areas of speed, expense, tooling costs, and the like, this logic may be implemented with an Application Specific Integrated Circuit (ASIC), Field Programmable Gate Array (FPGA), Programmable Logic Array (PLA), Programmable Logic Device (PLD), discrete gate or transistor logic, discrete hardware components, or any combination thereof.

The base station 110 may also include various interfaces. A wireless transceiver 220 may be used to support an air interface with each subscriber station 114 in its coverage region. A line transceiver 225 may be used to interface the base station 110 to the BSC 106.

The manner in which the base station 110 is implemented will depend on the particular application and the design constraints imposed on the overall system. Those skilled in the art will recognize the interchangeability of hardware, firmware, and software configurations under these circumstances, and how best to implement the described functionality for each particular application.

Operating Environment

Figure 5A:
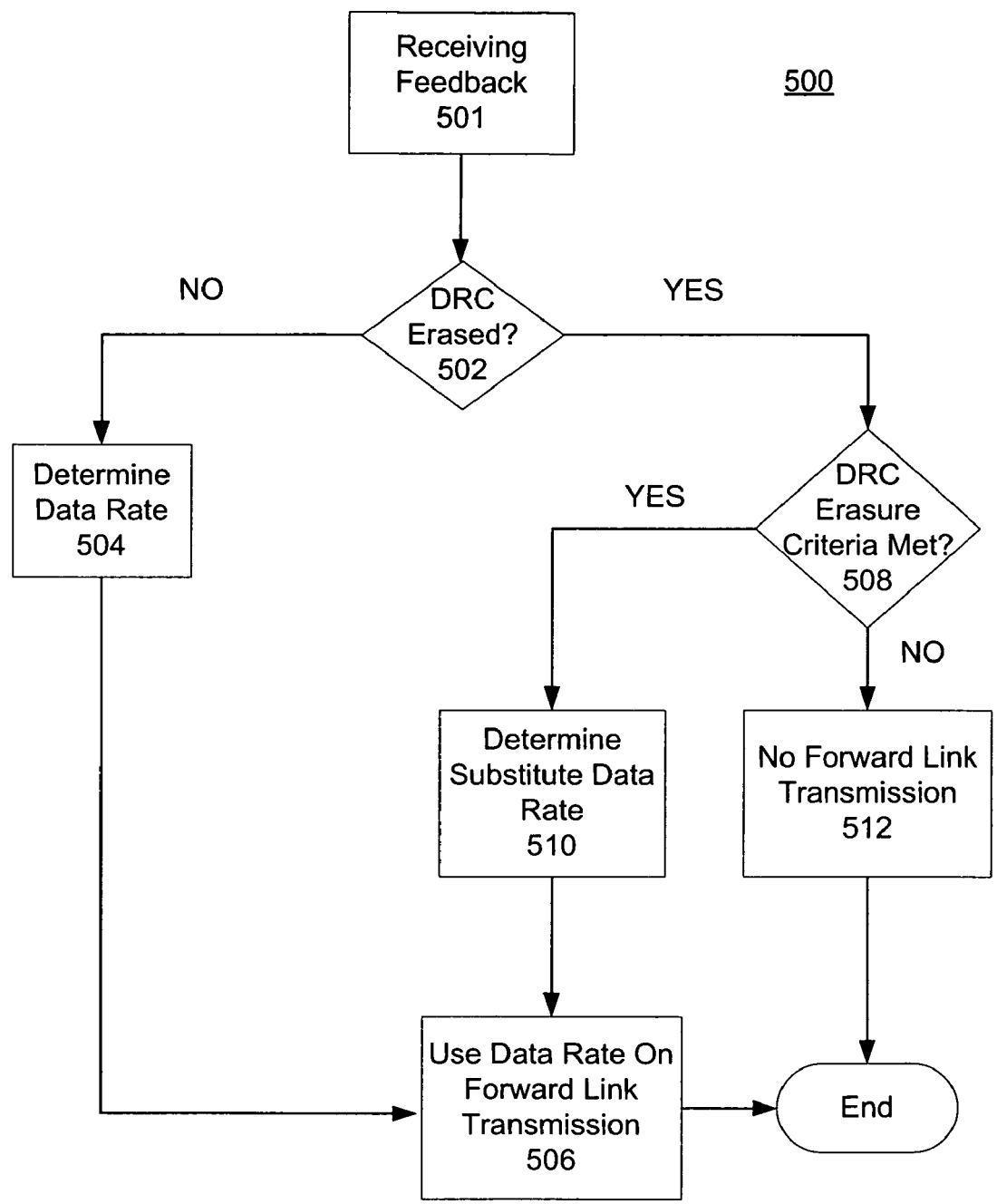
FIG. 5A is a flowchart illustrating an example of a method for a network entity to determine substitute data rates for transmissions from the base station to the subscriber station in response to data rate control (DRC) erasures.
Figure 5B:
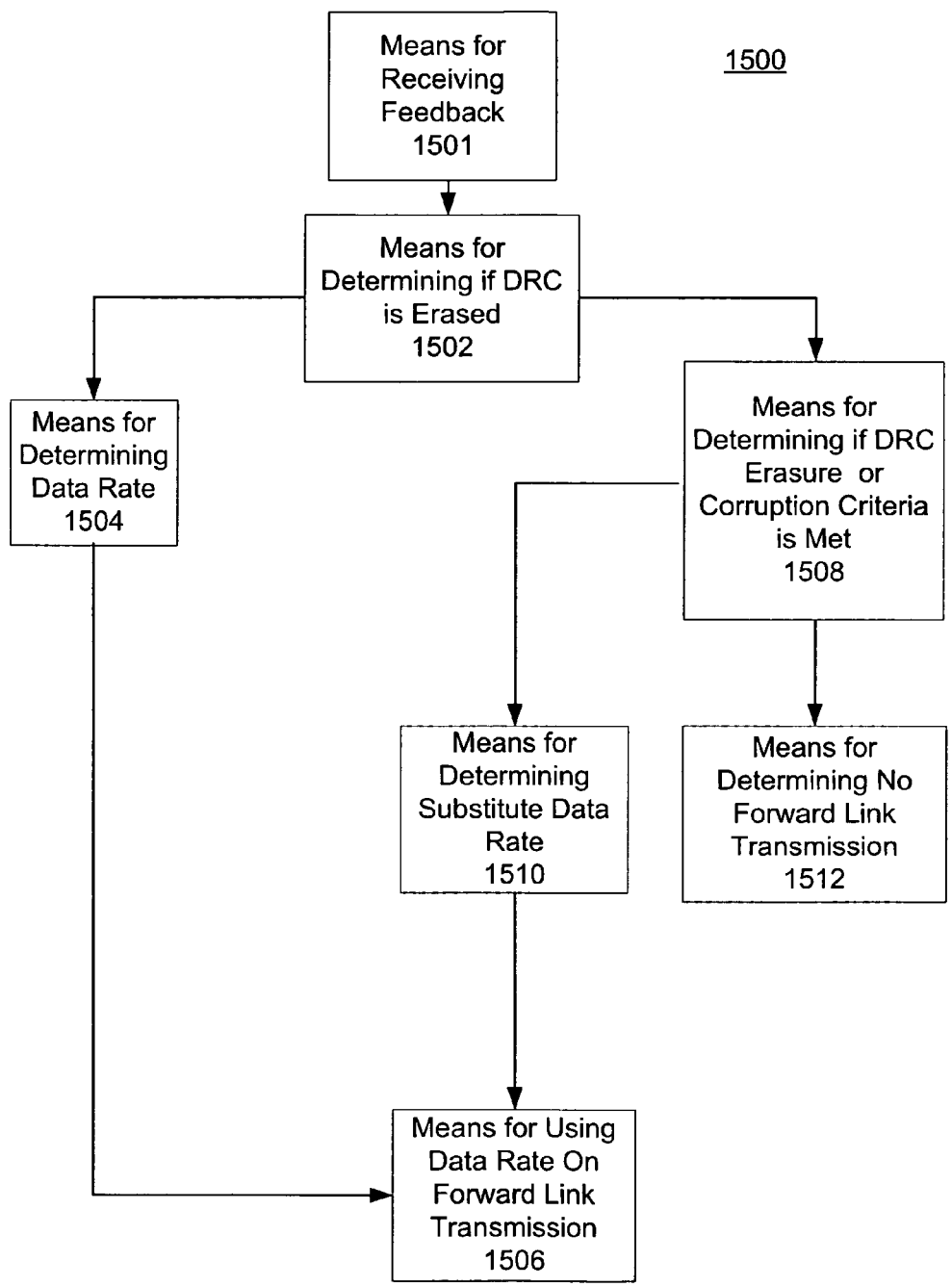
FIG. 5B is a logic block diagram of a means for determining substitute data rates for transmissions from the base station to the subscriber station in response to DRC erasures.

FIG. 5A shows an example of a method 500 performed by the base station, or any other network entity. For ease of explanation, but without any intended limitation, the example of FIG. 5A is described in the context of FIG. 1 described above. In this context, the method 500 is performed by each of the base stations.

Broadly, according to one embodiment of the method 500, a base station 110 evaluates each DRC value from a subscriber station 114 to determine whether it has been erased. If a DRC value is erased, the base station 110 uses a method to determine a substitute DRC value (for use in selecting an appropriate data rate), or in another embodiment the base station 110 directly determines a substitute data rate. Otherwise, if the DRC value is valid, the base station 110 uses the valid DRC value in selecting the appropriate data rate.

The base station 110 may separately perform the method 500 for each subscriber station 114 in the network 100, all subscriber stations 114 with which the base station 110 is communicating, or any other conceivable grouping of subscriber stations 114. Furthermore, the method 500 is only initiated whenever the base station 110 expects to receive a DRC value from one of the specified subscriber stations 114. In other words, the method 500 may be performed once for each "DRC length," i.e., the period of time between DRC values. The base station's 110 expectation of receiving a DRC value may be based on a predetermined schedule, periodicity, call/answer protocol, or other basis.

As another consideration, the base station 110 may limit performance of the method 500 in relation to a subscriber station 114 to occasions where the base station 110 contains any data pending transmission to that subscriber station 114. In this embodiment, initiation of the method 500 may be further limited to cases where the base station 110 not only has pending data for subscriber station 114, but such data has been in the base station's 110 transmit queue for a predetermined minimum length of time.

As yet another consideration, the base station 110 may restrict performance of the method 500 to transmissions of certain predefined classes of time critical data, such as Voice-over-Internet Protocol (VoIP) data.

The method 500 will now be discussed with reference to FIG. 5A. In step 501, feedback is received. In step 502, the base station 110 evaluates the DRC value to determine whether a DRC erasure has occurred. Whether or not the DRC value is deemed erased may depend, for example, on an evaluation of the DRC value, such as decodabilty by the base station 110, or comparison to a predetermined paradigm, pattern, protocol, signal strength threshold, or any other conceivable methodology.

If the base station 110 concludes at step 502 that the current DRC value is not an erasure, then the current DRC value is treated as valid, and processed in step 504. Namely, the base station 110 indexes the DRC value in the mapping tool 227 to identify a data rate and, in some cases, a data packet format corresponding to the DRC value in step 504. Next, in step 506, the base station uses the data rate and data packet format from the mapping tool 227 for one or more signal transmissions to the subscriber station 114. For instance, the data rate and data packet format selected in step 504 may be used for the next transmission to the subscriber station 114, for the next given number of transmissions, for a given time period, until a given event occurs, until the next DRC value or DRC erasure is received from the subscriber station 114, etc. After step 506, the method 500 returns to step 502 to evaluate the next DRC value that is received (or expected to be received) from subscriber station 114.

If the base station 110 identifies a DRC erasure, i.e, a corruption of feedback occurred at step 502, then the base station 110 performs step 508. In step 508, the base station 110 determines whether the erased DRC value satisfies certain criteria. By way of example, the base station 110 may require multiple DRC erasures before a substitute data rate is determined in step 510. In this example, a substitute data rate may not be determined unless a prescribed run length of two or more erasures (including the current erasure) has occurred. Otherwise, if the criteria is not satisfied in step 508, the base station 110 may not schedule a forward link transmission to the subscriber station 114 for the current time slot (step 512).

If the base station 110 identifies a DRC erasure at step 502, and the DRC erasure satisfies certain criteria in step 508, then the base station 110 performs step 510. Broadly, the base station 110, in step 510, determines a substitute data rate. As an optional intermediate step, the base station 110, in step 510, determines a substitute DRC value to replace the erased DRC value, and then utilizes the mapping tool 227 to identify a substitute data rate corresponding to the substitute DRC value. In either case, step 510 is followed by step 506 where the base station 110 uses the substitute data rate for one or more signal transmissions to the subscriber station 114, before returning to step 502 to evaluate the next DRC value. The substitute data rate may be used (step 510) for the next transmission to the subscriber station 114, the next given number of transmissions, for a given time period, until a given event occurs, until the next DRC value or DRC erasure is received from the subscriber station 114, etc.

As an enhancement to step 510, data packets may be formatted as multi-user packets, or a combination of multi-user and single-user packets. With "single-user" packets, each packet is intended for a specific subscriber station 114. "Multi-user" packets are directed to a group of multiple subscriber stations 114. A multi-user packet may contain at most eight higher layer packets for up to eight users. The standard IS-856 1xEV-DO (Revision A) describes the details of single and multi-user packets.

In one example of step 510, future transmissions by the base station 110 to the subscriber station 114 employ single-user packets and multi-user packets. In another example of step 510, future transmissions may only utilize multi-user packets. In either case, multi-user packets are included because if step 510 does not succeed in determining a workable substitute data rate, then limiting packets to a sole subscriber station 114 risks wasting the transmission when the subscriber station 114 is not able to successfully decode the data. This is because each subscriber station 114 is capable of processing ("decoding") received data packets at a pre-set data rate, which is determined by hardware, firmware, or other device configuration. Although subscriber stations 114 may additionally decode packets transmitted at data rates lower than the pre-set data rate (e.g., under Release A of 1xEV-DO), the base station 110 has a better chance of still reaching some subscriber stations 114 by utilizing multi-user packets in case the substitute data rate is incorrect.

Specific methodologies for determining substitute data rates in step 510 will now be described. As described above, step 510 may be performed by determining a substitute data rate directly, or determining a substitute DRC value as an intermediate step and mapping to derive a substitute data rate. In one example, step 510 is implemented using a "lowest available" approach. Namely, the base station 110, in step 510, chooses the lowest available data rate as the substitute data rate. "Available" refers to the lowest rate specified by the applicable standard observed by base station 110 (such as IS-856 1xEV-DO, Revision A), or alternatively, some predetermined minimal data rate that subscriber stations 114 are pre-programmed to always attempt to decode. Alternatively, under the "lowest available" approach, the base station 110, in step 510, selects the lowest available DRC value as the substitute DRC value. The foregoing approach is conservative, and therefore, likely to succeed in communicating to the subscriber station 114. If, however, the conditions would permit a higher data rate, then the base station 110 is not utilizing bandwidth as efficiently as possible.

Continuing with the discussion of step 510, another example is provided, which uses a "last known" approach. Here, step 510 is implemented by choosing the last data rate derived from a valid DRC value, and using this data rate as the substitute data rate. Alternatively, under the "last known" approach, the base station 110, in step 510, uses the last known DRC value that was received from the subscriber station 114 to map to a substitute DRC value.

The "last known" approaches discussed above are beneficial as utilizing a data rate recently known to be "good." If, however, the base station 110 continues to receive DRC erasures from the subscriber station 114, the reliability of this approach decreases over time because channel conditions might change, reducing the probability that the last known DRC value is still the correct one. Hence, as an extension to these approaches, the base station 110 may decrease the substitute data rate (or DRC value) according to a prescribed function until the next valid DRC value is received from the subscriber station 114, thereafter using such valid DRC value in step 506. This approach anticipates the possibility that channel conditions deteriorate over time. For example, the base station 110 may reduce the substitute data rate initially selected in step 510 according to a prescribed function such as one of the following: (1) by a fixed or variable increment per transmission, (2) by a fixed or variable increment per unit of time, (3) according to a preprogrammed linear or nonlinear mathematical function, (4) according to instructions from the network received on a push or pull basis, or (5) another function responsive to operating conditions. In the case of using a last known DRC value, the base station 110 may use a similar reduction plan as the foregoing to decrease the substitute DRC value initially selected.

Figure 6A:
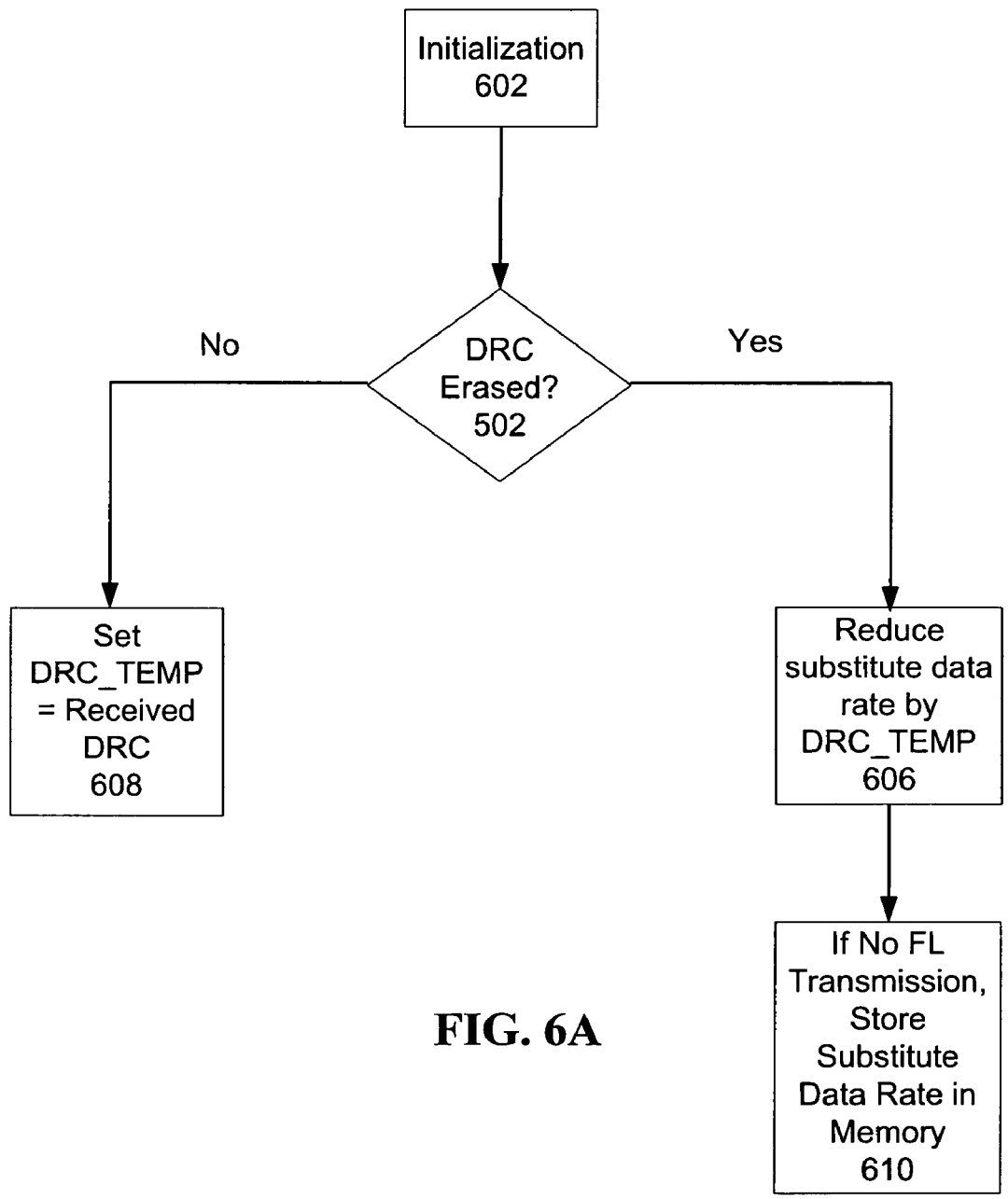
FIG. 6A is a flowchart illustrating an additional thread of the method depicted in FIG. 5A.
Figure 6B:
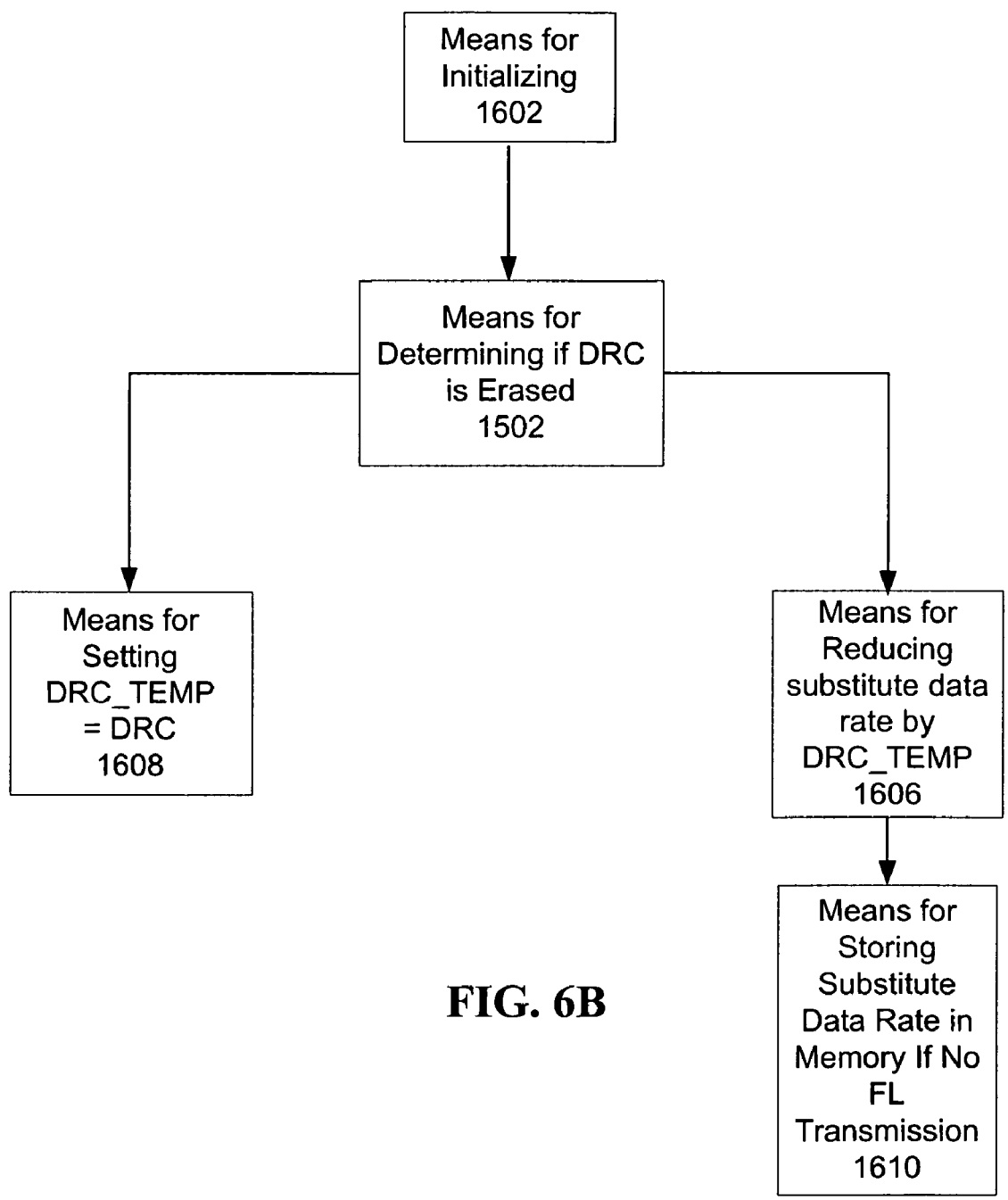
FIG. 6B is a block diagram of an additional thread of the means depicted in FIG. 5B.

In at least one embodiment of the base station 110, the method 500 may include a separate thread 600, illustrated in FIG. 6A. Base station 110 may optionally determine the substitute data rate in step 510 of FIG. 5A based on a temporary variable, "DRC_TEMP" generated using method 600.

"DRC_TEMP" is a state variable stored using the method of thread 600, and may represent a different value during each slot. The method of thread 600 (FIG. 6A) may be executed every slot and generate variable "DRC_TEMP". This means the value of "DRC_TEMP" is maintained and updated every slot. Thread 600 is initialized in step 602 and it is determined in step 502 whether a DRC has been erased. If the DRC value is determined to have been erased, the substitute data rate in step 510 of FIG. 5A may be reduced by the stored value "DRC_TEMP" (step 606). If there is no forward link transmission (step 512 of FIG. 5A), the substitute data rate is stored in memory (step 610).

If it is determined in step 502 that a DRC is not erased, in step 608, the state variable is reset, i.e., "DRC_TEMP" is set to the DRC value that was received in that slot. Thus, the base station 110 has the option to change the substitute data rate according to a prescribed method similar to that used in connection with the "last known" approach described above or based on the temporary value "DRC_TEMP."

The use of a value determined in thread 600 may be more reliable than determining a substitute data based on the "last known" approach in step 510 (see FIG. 5A) because it accounts for the time delay required for the DRC erasure criteria to be met in step 508 (see FIG. 5A).

As an alternative approach to using the "lowest available" or "last known" DRC value in step 506, the method 500 may first relax the thresholds used to determine whether a DRC erasure has occurred in step 502, and then utilize the relaxed thresholds to reevaluate the DRC value. This may be accomplished by lowering the DRC erasure threshold in order to generate the most likely DRC value. More specifically, the DRC erasure threshold is lowered until a single, valid DRC value is generated by the base station 110. The resultant DRC value becomes the substitute DRC value in step 510, and this value is subsequently mapped to a substitute data rate.

Figure 7A:
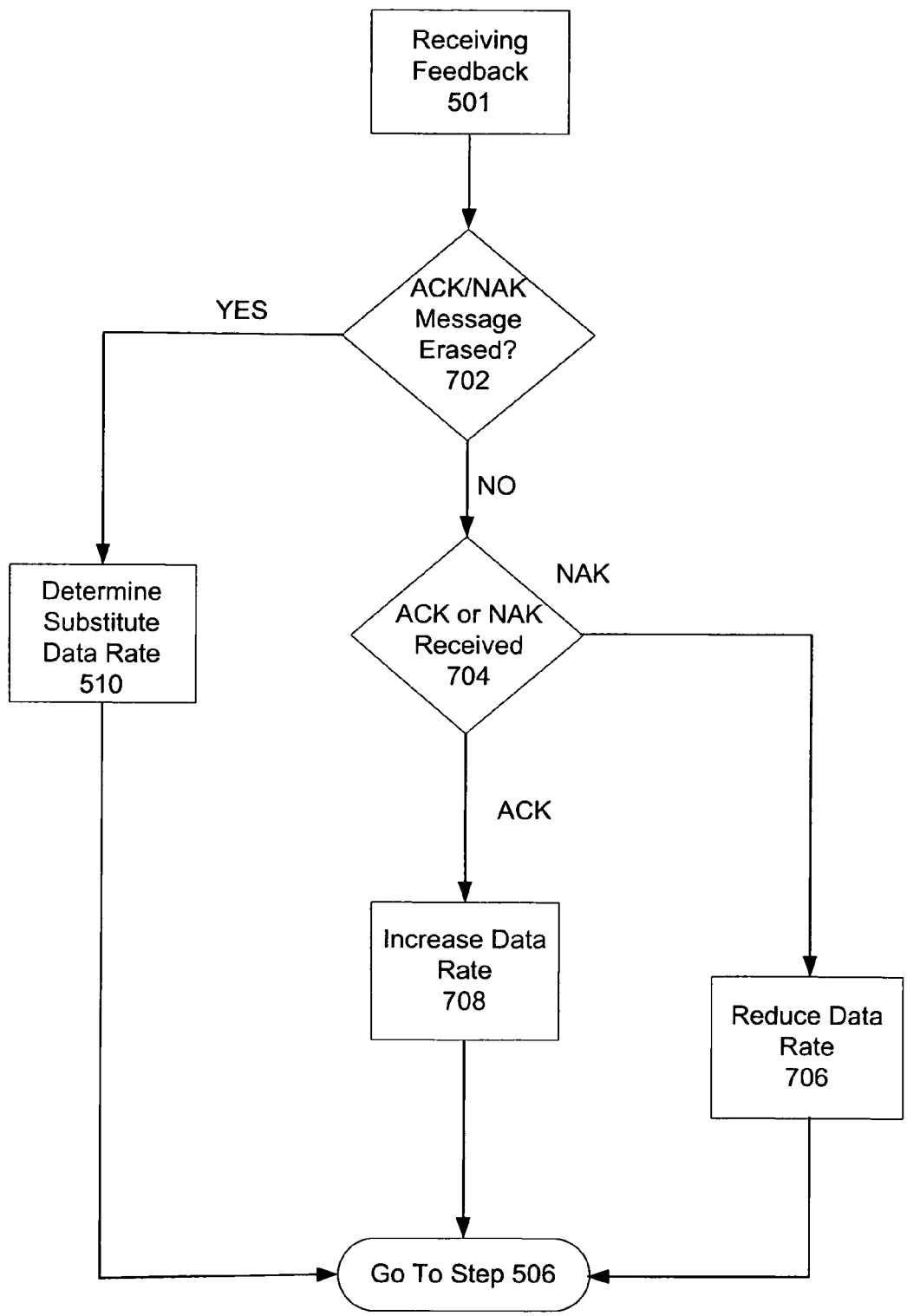
FIG. 7A is a flowchart illustrating a method for determining substitute data rates in FIG. 5A based, in part, on acknowledgement (ACK) messages received from the subscriber station.
Figure 7B:
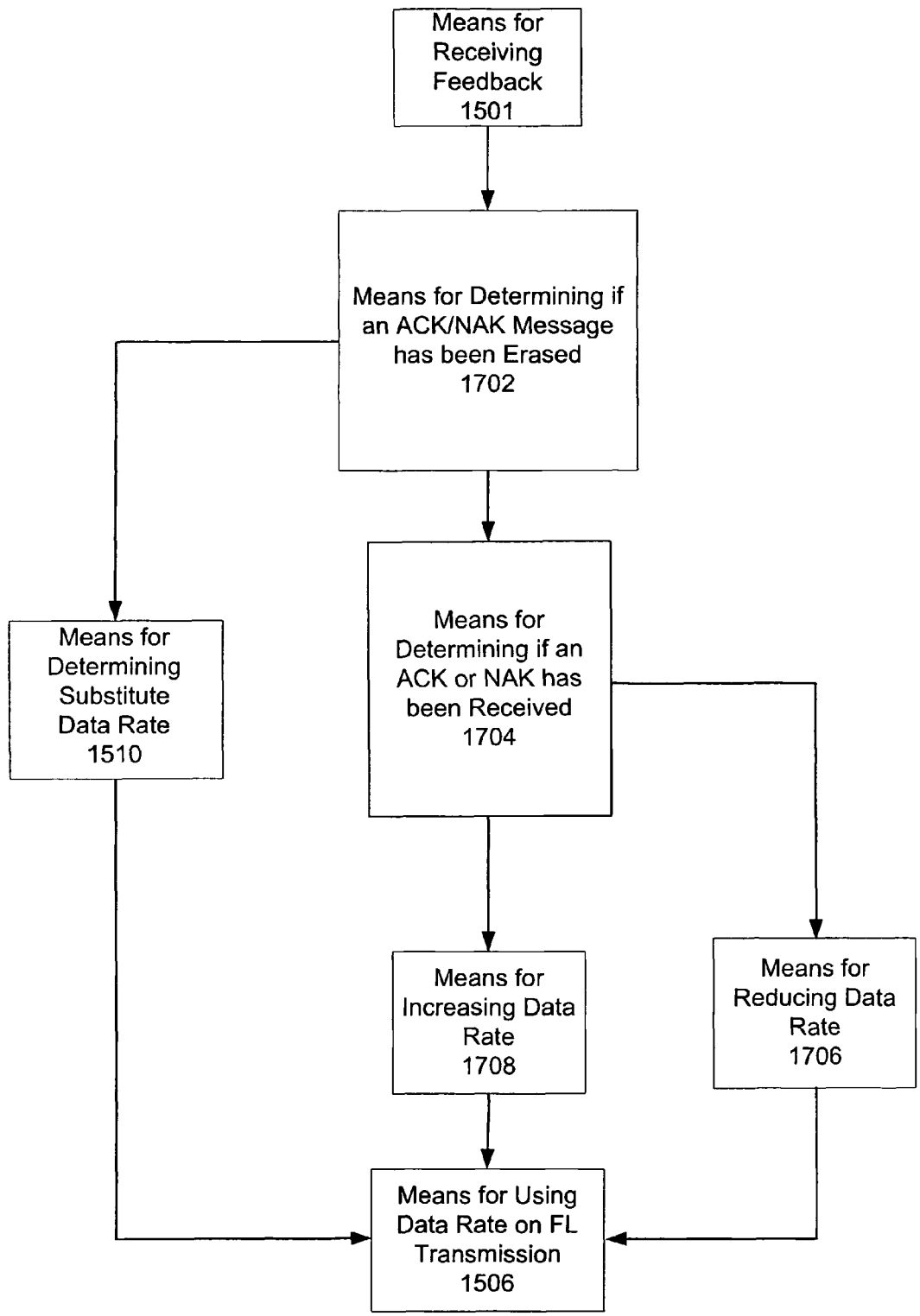
FIG. 7B is a logic block diagram of a means for determining substitute data rates in FIG. 5B based, in part, on ACK messages received from the subscriber station.

An alternative approach to determining a substitute data rate in step 510 will now be discussed in connection with FIG. 7A. Using this approach, the substitute data rate determined by the base station 110 depends upon whether the forward link transmission is a retransmission of a data packet that was unsuccessfully decoded by the subscriber station 114, (received a NAK) or successfully decoded (received an ACK). Referring to FIG. 7A, the base station 110 receives DRC feedback 501, and determines, in step 702, whether an ACK/NAK erasure has occurred. Whether or not the ACK/NAK message is deemed erased may depend, for example, on an evaluation of the ACK/NAK message, such as decodabilty by the base station 110, or comparison to a predetermined paradigm, pattern, protocol, signal strength threshold, or any other conceivable methodology.

If the base station 110 determines at step 702 that a current ACK/NAK message is erased, then the base station 110 determines a substitute data rate in step 510 as described above in connection with FIG. 5A. That is, the base station 110 determines a substitute data rate using the "lowest available" or "last known" data rate. Alternatively, the base station 110 may determine the "lowest available" or "last known" DRC value and map it to a substitute data rate. If the base station 110 uses the "last known" approach to either determine a substitute data rate or DRC value, it may decrease the data rate (or DRC value) over time to increase the probability of a successful forward link signal transmission. The base station 110 may relax the thresholds used to determine whether a DRC erasure has occurred as an alternative to the "lowest available" or "last known" approach. In any event, once the base station 110 determines a substitute data rate in step 510, it uses the substitute data rate in one or more signal transmissions to the subscriber station 114, i.e., returns to step 506 in FIG. 5A.

If the base station 110 determines at step 702 that the current ACK/NAK message has not been erased, then the ACK/NAK message is treated as valid and processed. In step 704, the base station 110 determines whether the message is an ACK or NAK message. In response to a NAK message, the base station 110 reduces the current data rate in step 706, and uses the reduced data rate for the next forward link transmission to the subscriber station 114 and returns to step 506 in FIG. 5A. The base station 110 may reduce the current data rate to a prescribed method similar to that used in connection with the "last known" approach for determining a substitute data rate (or DRC value).

In response to an ACK message, the base station 110 determines, in step 708, a substitute data rate within a prescribed range. The prescribed range, in this example, has as a minimum value, the data rate used to send the previous forward link transmission to the subscriber station 114, and as a maximum value, the data rate for the last valid DRC value received by the base station 110. In other words, the base station 110 increases the data rate of the forward link transmission in response to ACK message to a maximum corresponding to the last valid DRC value received by the base station 110. The base station 110 then uses the increased data rate for the next forward link transmission to the subscriber station 114 and returns to step 506 in FIG. 5A.

The methods of FIGS. 5A-7A described above may be performed by corresponding means plus function blocks illustrated in FIGS. 5B-7B. In other words, steps 501, 502, 504, 506, 508, 510 and 512 illustrated in FIG. 5A correspond to means plus function blocks 1501, 1502, 1504, 1506, 1508, 1510 and 1512 illustrated in FIG. 5B. Steps 602, 502, 606, 608 and 610 illustrated in FIG. 6A correspond to means plus function blocks 1602, 1502, 1606, 1608 and 1610 illustrated in FIG. 6B. Steps 501, 506, 510, 702, 704, 706 and 708 illustrated in FIG. 7A correspond to means plus function blocks 1501, 1506, 1510, 1702, 1704, 1706 and 1708 illustrated in FIG. 7B.

Other Embodiments

While the foregoing disclosure shows a number of illustrative embodiments, it will be apparent to those skilled in the art that various changes and modifications may be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences are set forth in a given specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, process steps, or other functionality described herein may be implemented as electronic hardware, firmware, computer software, or combinations thereof. Recognizing this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a wireless communications device. In the alternative, the processor and the storage medium may reside as discrete components in a wireless communications device.

Moreover, the previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The word "exemplary" is used herein to mean "serving as an example, instance, or illustration." Any embodiment described herein as "exemplary" is not necessarily to be construed as preferred or advantageous over other embodiments.

What is claimed is:

1. A wireless communication network entity comprising:
   a) a processor configured to regulate the data rate of transmissions over a wireless channel from a base station to a subscriber station based on feedback of a data rate control (DRC) value from the subscriber station relating to wireless channel conditions, the processor being further configured to;
   b) determine a substitute data rate for one or more transmissions over the wireless channel from the base station to the subscriber station when the feedback is corrupted; wherein the processor is further configured to;
   c) determine if a corruption criteria comprising a DRC erasure is met; and further configured to;
   d) transmit the substitute data rate on a forward link to a subscribe station if the corruption criteria is met; and wherein the one or more criteria further requires a minimum time between the DRC erasure and the last known DRC value received from the subscriber station; and
   wherein the processor is further configured to monitor additional feedback from the subscriber station relating to the ability of the subscriber station to decode a transmission from the base station, wherein;
   the processor is configured to incrementally increase the substitute data rate for one or more transmissions from the base station to the subscriber station while the feedback remains corrupted and the subscriber station is able to decode transmissions; and
   the processor is configured to incrementally decrease the substitute data rate for one or more transmissions from the base station to the subscriber station while the feedback remains corrupted and the subscriber station is unable to decode transmissions.

2. The network entity of claim 1, wherein the network entity comprises the base station having a transceiver configured to support the wireless channel with the subscriber station.

3. The network entity of claim 1, wherein the DRC value comprises the combined DRC values from a plurality of base stations in communication with the subscriber station.

4. The network entity of claim 1, wherein the processor is further configured to determine the substitute data rate by relaxing the decoding requirements for the DRC value to eradicate the DRC erasure, and mapping the resultant DRC value to the substitute DRC value.

5. The network entity of claim 1, wherein the processor is further configured to suppress a transmission over the wireless channel from the base station to the subscriber station in response to a DRC erasure when the minimum time period between the DRC erasure and the last valid DRC value has not elapsed.

6. The network entity of claim 1, wherein the processor is further configured to determine the substitute data rate by determining a substitute DRC value and mapping the substituted DRC value to the substituted data rate.

7. The network entity of claim 6, wherein the processor is further configured to select the lowest available DRC value as the substitute DRC value.

8. The network entity of claim 6, wherein the processor is further configured to select the last known DRC value received from the subscriber station as the substitute DRC value.

9. The network entity of claim 1, wherein the processor is further configured to select the lowest available data rate as the substitute data rate.

10. The network entity of claim 1, wherein the processor is further configured to select the data rate for the last known DRC value received from the subscriber station as the substitute data rate.

11. The network entity of claim 1, wherein the processor is further configured to format one or more transmissions from the base station to the subscriber station in a multi-packet format while the feedback remains corrupted.

12. A wireless communication base station comprising:
a transceiver configured to support a wireless channel with a subscriber station; and
a processor configured to regulate the data rate of transmissions over a wireless channel to the subscriber station based on feedback of a data rate control (DRC) value from the subscriber station, the feedback relating to the wireless channel conditions, the processor being further configured to determine whether the feedback is corrupted based on one or more criteria, and determine a substitute data rate for one or more transmissions to the subscriber station if the feedback is corrupted; and
wherein the one or more criteria further requires a minimum time between the DRC erasure and the last known DRC value received from the subscriber station; and
wherein the processor is further configured to monitor additional feedback from the subscriber station relating to the ability of the subscriber station to decode a transmission from the base station, wherein;
the processor is configured to incrementally increase the substitute data rate for one or more transmissions to the subscriber station while the feedback remains corrupted and the subscriber station is able to decode transmissions; and
the processor is configured to incrementally decrease the substitute data rate for one or more transmissions to the subscriber station while the feedback remains corrupted and the subscriber station is unable to decode transmissions.

13. The base station of claim 12, wherein the feedback comprises a data rate control (DRC) value.

14. The base station of claim 13, wherein the one or more criteria comprises a DRC erasure.

15. The base station of claim 14, wherein the processor is further configured to determine the substitute data rate by relaxing the decoding requirements for the DRC value to eradicate the DRC erasure, and mapping the resultant DRC value to the substitute DRC value.

16. The base station of claim 12, wherein the processor is further configured to suppress a transmission over the wireless channel to the subscriber station in response to a DRC erasure when the minimum time period between the DRC erasure and the last valid DRC value has not elapsed.

17. The base station of claim 12, wherein the processor is further configured to determine the substitute data rate by determining a substitute DRC value and mapping the substituted DRC value to the substituted data rate.

18. The base station of claim 17, wherein the processor is further configured to select the lowest available DRC value as the substitute DRC value.

19. The base station of claim 17, wherein the processor is further configured to select the last known DRC value received from the subscriber station as the substitute DRC value.

20. The base station of claim 12, wherein the processor is further configured to select the lowest available data rate as the substitute data rate.

21. The base station of claim 12, wherein the processor is further configured to select the data rate for the last known DRC value received from the subscriber station as the substitute data rate.

22. The base station of claim 12, wherein the processor is further configured to format one or more transmissions to the subscriber station in a multi-packet format while the feedback remains corrupted.

23. A non-transitory computer-readable media embodying a program of instructions to a processor to perform regulating the data rate of transmissions over a wireless channel from a base station to a subscriber station based on feedback of a data rate control (DRC) value relating to the subscriber station, of wireless channel conditions, comprising:
receiving corrupted feedback;
determining a substitute data rate for one or more transmissions from the base station to the subscriber station in response to the corrupted feedback, wherein;
the processor is configured to incrementally increase the substitute data rate for one or more transmissions to the subscriber station while the feedback remains corrupted and the subscriber station is able to decode transmissions; and
the processor is configured to incrementally decrease the substitute data rate for one or more transmissions to the subscriber station while the feedback remains corrupted and the subscriber station is unable to decode transmissions.

24. The computer-readable media of claim 23, wherein the feedback comprises a data rate control (DRC) value, the method further comprising determining that the feedback is corrupted based on one or more criteria, the one or more criteria comprising a DRC erasure.

25. The computer-readable media of claim 24, wherein the processor is further configured to determine the substitute data rate by relaxing the decoding requirements for the DRC value to eradicate the DRC erasure, and mapping the resultant DRC value to the substitute DRC value.

26. The computer-readable media of claim 24, wherein the one or more criteria further requires a minimum time period between the DRC erasure and the last known DRC value received from the subscriber station.

27. The computer readable media of claim 23, wherein the feedback comprises a data rate control (DRC) value, the substituted data rate being determined by selecting a substitute DRC value and mapping the substituted DRC value to the substituted data rate.

28. The computer-readable media of claim 27, wherein the substitute DRC value is the lowest available DRC value.

29. The computer-readable media of claim 27, wherein the substitute DRC value is the last known DRC value received from the subscriber station.

30. The computer-readable media of claim 23, wherein the substitute data rate is determined to be the lowest available data rate.

31. The computer-readable media of claim 23, wherein the substitute data rate is determined to be last known data rate for a transmission to the subscriber station.

32. The computer-readable media of claim 23, further comprising formatting all transmissions to the subscriber station in a multi-packet format while the feedback remains corrupted.

33. A method of using a processor to regulate a data rate of transmissions over a wireless channel from a base station to a subscriber station based on feedback of a data rate control (DRC) value from the subscriber station to improve reliability of received control information from the subscriber station, the feedback relating to the wireless channel conditions, comprising:
receiving corrupted feedback;
determining a substitute data rate for one or more transmissions from the base station to the subscriber station in response to the corrupted feedback, if a corruption criteria is met; wherein;
the processor is configured to incrementally increase the substitute data rate for one or more transmissions to the subscriber station while the feedback remains corrupted and the subscriber station is able to decode transmissions; and
the processor is configured to incrementally decrease the substitute data rate for one or more transmissions to the subscriber station while the feedback remains corrupted and the subscriber station is unable to decode transmissions.

34. The method of claim 33, further comprising:
if the corruption criteria is met, transmitting the substitute data rate on a forward link.

35. The method of claim 34, wherein the step of determining if a corruption criteria is met comprises:
determining if two or more corrupted feedbacks occurred.

36. The method of claim 34, wherein the step of determining a substitute data rate comprises:
selecting a lowest available DRC value; and
mapping the lowest available DRC value to a data rate.

37. The method of claim 34, wherein the step of determining a substitute data rate comprises:
choosing a last data rate derived from a valid DRC value.

38. A wireless communication network entity-comprising:
a) processor means configured to regulate the data rate of transmissions over a wireless channel from a base station to a subscriber station based on feedback of a data rate control (DRC) value from the subscriber station relating to wireless channel conditions, said processor means being further configured to;
b) determine a substitute data rate for one or more transmissions over the wireless channel from the base station to the subscriber station when the feedback is corrupted; wherein the processor is further configured to;
c) determine if a corruption criteria comprising a DRC erasure is met; and further configured to;
d) transmit the substitute data rate on a forward link to a subscribe station if the corruption criteria is met; and wherein the one or more criteria further requires a minimum time between the DRC erasure and the last known DRC value received from the subscriber station; and
wherein said processor means is further configured to monitor additional feedback from the subscriber station relating to the ability of the subscriber station to decode a transmission from the base station, wherein;
said processor means is configured to incrementally increase the substitute data rate for one or more transmissions from the base station to the subscriber station while the feedback remains corrupted and the subscriber station is able to decode transmissions; and
said processor means is configured to incrementally decrease the substitute data rate for one or more transmissions from the base station to the subscriber station while the feedback remains corrupted and the subscriber station is unable to decode transmissions.

39. A wireless communication base station comprising:
transceiver means configured to support a wireless channel with a subscriber station; and
processor means configured to regulate the data rate of transmissions over a wireless channel to the subscriber station based on feedback of a data rate control (DRC) value from the subscriber station, the feedback relating to the wireless channel conditions, the processor being further configured to determine whether the feedback is corrupted based on one or more criteria, and determine a substitute data rate for one or more transmissions to the subscriber station if the feedback is corrupted; and wherein the one or more criteria further requires a minimum time between the DRC erasure and the last known DRC value received from the subscriber station; and
wherein said processor means is further configured to monitor additional feedback from the subscriber station relating to the ability of the subscriber station to decode a transmission from the base station, wherein;
said processor means is configured to incrementally increase the substitute data rate for one or more transmissions to the subscriber station while the feedback remains corrupted and the subscriber station is able to decode transmissions; and
said processor means is configured to incrementally decrease the substitute data rate for one or more transmissions to the subscriber station while the feedback remains corrupted and the subscriber station is unable to decode transmissions.

40. A non-transitory computer-readable media embodying a program of instructions to processor means to perform regulating the data rate of transmissions over a wireless channel from a base station to a subscriber station based on feedback of a data rate control (DRC) value relating to the subscriber station, of wireless channel conditions, comprising:
means to receive corrupted feedback;
means for determining a substitute data rate for one or more transmissions from the base station to the subscriber station in response to the corrupted feedback, wherein;
said processor means is configured to incrementally increase the substitute data rate for one or more transmissions to the subscriber station while the feedback remains corrupted and the subscriber station is able to decode transmissions; and
said processor means is configured to incrementally decrease the substitute data rate for one or more transmissions to the subscriber station while the feedback remains corrupted and the subscriber station is unable to decode transmissions.

41. A method of using a processor to regulate a data rate of transmissions over a wireless channel from a base station to a subscriber station based on feedback of a data rate control (DRC) value from the subscriber station to improve reliability of received control information from the subscriber station, the feedback relating to the wireless channel conditions, comprising:

means for receiving corrupted feedback;

means for determining a substitute data rate for one or more transmissions from the base station to the subscriber station in response to the corrupted feedback, if a corruption criteria is met; wherein;

said processor means is configured to incrementally increase the substitute data rate for one or more transmissions to the subscriber station while the feedback remains corrupted and the subscriber station is able to decode transmissions; and said processor means is configured to incrementally decrease the substitute data rate for one or more transmissions to the subscriber station while the feedback remains corrupted and the subscriber station is unable to decode transmissions.

\* \* \* \* \*